A. R. LAUBENSTEIN.
FLY SWATTER.
APPLICATION FILED FEB. 4, 1916.
1,179,114.
Patented Apr. 11, 1916.
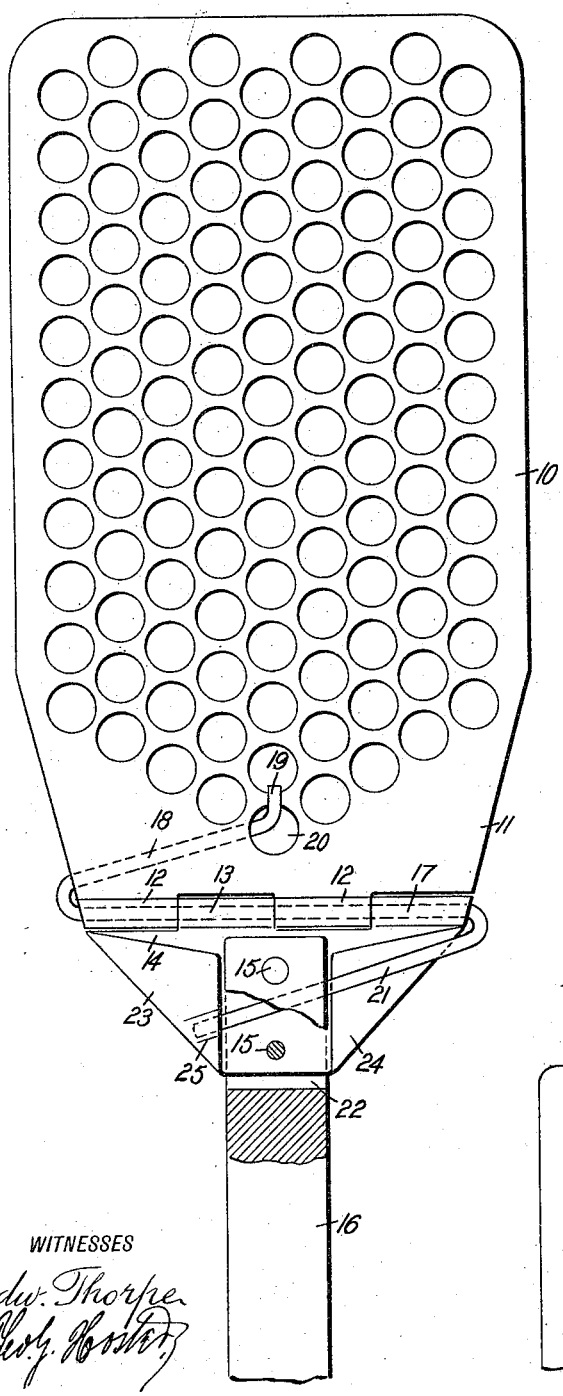
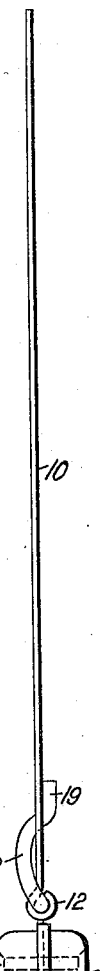
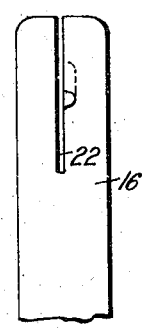
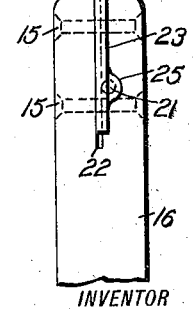
WITNESSES
Edw. Thorpe
Theo. J. Hoover
INVENTOR
A. R. Laubenstein
BY Munn & Co
ATTORNEYS
THE COLUMBIA PLANOGRAPH CO., WASHINGTON, D. C.

UNITED STATES PATENT OFFICE.

ALBERT RAYMOND LAUBENSTEIN, OF ASHLAND, PENNSYLVANIA.

FLY-SWATTER.

1,179,114.   Specification of Letters Patent.   Patented Apr. 11, 1916.

Application filed February 4, 1916. Serial No. 76,124.

*To all whom it may concern:*

Be it known that I, ALBERT R. LAUBENSTEIN, a citizen of the United States, and a resident of Ashland, in the county of Schuykill and State of Pennsylvania, have invented a new and Improved Fly-Swatter, of which the following is a full, clear, and exact description.

The object of the invention is to provide a new and improved fly swatter arranged to permit the handle and the swatting member to readily assume angular positions one relatively to the other to cause the swatting member to lie flat on the surface on which a fly or other insect is swatted, thus preventing escape of the fly or insect.

In order to accomplish the desired result, use is made of a handle, a swatting member and a spring hinge connecting the said handle and swatting member with each other to hold the handle and swatting member normally in the same plane and to allow the handle and swatting member to assume an angular position one relatively to the other.

A practical embodiment of the invention is represented in the accompanying drawings forming a part of this specification, in which similar characters of reference indicate corresponding parts in all the views.

Figure 1 is a plan view of the fly swatter with parts of the handle shown in section; Fig. 2 is an edge view of the same; and Fig. 3 is a similar view of part of the handle.

The swatting member 10 is of flat shape and made of wire cloth, perforate metal or a similar material, and the inner end of the member 10 terminates in a hinge member 11 provided with eyes 12 registering with similar eyes 13 formed on a hinge member 14 fastened by rivets or other fastening means 15 to one end of a handle 16. The eyes 12 and 13 are engaged by a pintle 17 terminating at one end of a spring extension 18 overlying one side of the hinge member 11 and terminating in an angular lug 19 extending through one of the perforations 20 of the swatting member 10, the lug bearing on the opposite face of the said swatting member. The other end of the pintle 17 is provided with a spring extension 21 overlying the hinge member 14 so that the swatting member 10 and the handle 16 are normally extending in the same plane, as will be readily understood by reference to the drawings. When a fly or other insect is swatted, the swatting member 10 can readily assume an angular position to the handle 16 so that the swatting member 10 lies flat on the surface on which the fly or other insect is swatted at the time to prevent escape of such fly or insect.

The hinge member 14 extends through a slot 22 formed in the upper end of the handle 16, and the sides of the said member 14 have return bent flanges 23 and 24, the inner edges of which abut against the sides of the handle 16 to securely hold the hinge member 14 in position on the handle 16. The flange 23 is provided with a struck-up socket 25 into which projects the terminal of the hinge extension 21 after the latter has passed sidewise through the handle 16, as plainly indicated in Fig. 1.

By the arrangement described an exceedingly strong and durable construction is had, and the swatting member 10 can readily assume an angular position to the handle as previously explained.

Having thus described my invention, I claim as new and desire to secure by Letters Patent:

1. A fly swatter, comprising a handle, a swatting member and a spring hinge connecting the said handle and swatting member with each other to hold the handle and swatting member normally in the same plane and to allow the handle and swatting member to assume an angular position one relatively to the other.

2. A fly swatter, comprising a handle, a swatting member and a hinge connecting the said handle and swatting member with each other, the pintle of the hinge having spring extensions of which one engages the handle and the other the said swatting member.

3. A fly swatter, comprising a handle provided at one end with a hinge leaf, a perforate swatting member terminating at one end in a hinge leaf, and a pintle engaging the said leaves and having spring extensions, of which one engages the handle and the other the said swatting member.

4. A fly swatter, comprising a handle provided at one end with a hinge leaf, a perforate swatting member terminating at one end in a hinge leaf, and a pintle engaging the said leaves and having spring extensions bent inwardly in opposite directions, one of the extensions overlying the swatting member and having an angular terminal engaging one of the perforations of the swatting member, the other extension passing sidewise through the said handle.

5. A hinge, comprising a pair of leaves having eyes, and a pintle extending through the eyes and having spring extensions overlying the leaves on opposite faces to hold the leaves normally in the same plane and to allow the leaves to assume an angular position one relatively to the other.

6. A hinge, comprising a pair of leaves having eyes, and a pintle extending through the eyes and having spring extensions bent inwardly in opposite directions and overlying the leaves on opposite faces to hold the leaves normally in the same plane and to allow the leaves to assume an angular position one relatively to the other.

In testimony whereof I have signed my name to this specification in the presence of two subscribing witnesses.

ALBERT RAYMOND LAUBENSTEIN.

Witnesses:
  FRANK J. LAUBENSTEIN,
  EDWIN C. PRICE.

Copies of this patent may be obtained for five cents each, by addressing the "Commissioner of Patents, Washington, D. C."